(12) United States Patent
Ichiki et al.

(10) Patent No.: US 10,906,216 B2
(45) Date of Patent: Feb. 2, 2021

(54) METHOD FOR MANUFACTURING FOAM MOLDED ARTICLE, AND FOAM MOLDED ARTICLE

(71) Applicant: BANDO CHEMICAL INDUSTRIES, LTD., Kobe (JP)

(72) Inventors: Tomohito Ichiki, Hyogo (JP); Saki Jindai, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 281 days.

(21) Appl. No.: 16/061,613

(22) PCT Filed: Sep. 28, 2016

(86) PCT No.: PCT/JP2016/078563
§ 371 (c)(1),
(2) Date: Jun. 12, 2018

(87) PCT Pub. No.: WO2017/104217
PCT Pub. Date: Jun. 22, 2017

(65) Prior Publication Data
US 2019/0344486 A1 Nov. 14, 2019

(30) Foreign Application Priority Data
Dec. 15, 2015 (JP) .................. 2015-244343

(51) Int. Cl.
*B29C 44/58* (2006.01)
*B29C 44/42* (2006.01)
(Continued)

(52) U.S. Cl.
CPC .......... *B29C 44/586* (2013.01); *B29C 44/422* (2013.01); *B65D 1/40* (2013.01); *B29K 2105/043* (2013.01); *B29L 2031/7132* (2013.01)

(58) Field of Classification Search
CPC ... B29C 44/586; B29C 44/585; B29C 44/422; B29C 33/308; B29C 45/00;
(Continued)

(56) References Cited

U.S. PATENT DOCUMENTS

| 2008/0305339 A1 | 12/2008 | Kotaki |
| 2009/0140447 A1 | 6/2009 | Kawamura et al. |
| 2012/0094109 A1 | 4/2012 | Komatsu |

FOREIGN PATENT DOCUMENTS

| CN | 1396050 | 2/2003 |
| CN | 101068670 | 11/2007 |

(Continued)

*Primary Examiner* — Stella K Yi
(74) *Attorney, Agent, or Firm* — Hamre, Schumann, Mueller & Larson, P.C.

(57) ABSTRACT

The present invention provides a method for manufacturing a molded foam product which can reduce or prevent blisters and crinkles on the surface even in the case of manufacturing a molded product designed to have a small thickness, thereby giving a molded foam product having excellent heat insulation while avoiding an increase in the amounts of materials used. The method for manufacturing a molded foam product according to the present invention includes the steps of: injecting, during injection molding, a molten resin containing a supercritical fluid or a chemical foaming agent into a cavity formed in a mold that includes a movable portion; and moving the movable portion to increase the volume of the cavity before the molten resin injected into the cavity completely solidifies, the mold alternately including, in a direction from a resin injection port to the periphery of the cavity, first linear portions each giving a large gap size in the cavity and second linear portions each giving a small gap size in the cavity.

5 Claims, 10 Drawing Sheets

(51) Int. Cl.
*B65D 1/40* (2006.01)
*B29K 105/04* (2006.01)
*B29L 31/00* (2006.01)

(58) Field of Classification Search
CPC . B29C 2045/0049; B29C 45/03; B29C 45/04;
B29C 2045/2695; B29C 45/56; B29C
2045/563; B29C 2045/569; B29C
2045/5695; B65D 1/40
See application file for complete search history.

(56) References Cited

FOREIGN PATENT DOCUMENTS

| | | |
|---|---|---|
| CN | 101323164 | 12/2008 |
| DE | 102006008184 | 8/2007 |
| EP | 1 273 418 | 1/2003 |
| EP | 1 806 217 | 7/2007 |
| JP | 9-272571 | 10/1997 |
| JP | 2001-277304 | 10/2001 |
| JP | 2002-019760 | 1/2002 |
| JP | 2002-067111 | 3/2002 |
| JP | 2003-231148 | 8/2003 |
| JP | 2009-226872 | 10/2009 |
| JP | 5283710 B | 9/2013 |
| WO | 2011/001791 | 1/2011 |

(a) Before core-back process (b) After core-back process (a)

(b)

(a)

(b)

METHOD FOR MANUFACTURING FOAM MOLDED ARTICLE, AND FOAM MOLDED ARTICLE

TECHNICAL FIELD

The present invention relates to methods for manufacturing a molded foam product, and molded foam products.

BACKGROUND ART

Molded foam products are featured with, for example, a light weight, reduced amounts of materials used, and excellent heat insulation. Molded foam products are therefore used in various applications such as food containers, daily necessities, and home appliances.

Molded foam products can be typically manufactured by causing a resin composition injected into a mold to foam while molding the resin composition. Known methods to cause foaming are, for example, a method decomposing a foaming agent in a resin composition and a method injecting gas into a resin composition. There is also a recently studied method which injects a fluid in a supercritical state into a resin composition. Also, known methods for molding a resin composition include injection molding, for example. These methods for manufacturing a molded foam product are disclosed in, for example, Patent Literatures 1 to 3.

CITATION LIST

Patent Literature

Patent Literature 1: JP 2002-067111 A
Patent Literature 2: JP 2003-231148 A
Patent Literature 3: JP 5283710 B

SUMMARY OF INVENTION

Technical Problem

Molded foam products intended to insulate heat are preferred to include as small a region of unfoamed portions as possible, but such molded foam products exhibit poor strength and heat resistance. Also, molded foam products caused to foam by a process of moving back a portion of a mold (core-back process) in injection molding have a structure in which unfoamed layers (skin layers) constitute the surfaces of the product on which the mold pattern is transferred and a foamed layer is sandwiched between the skin layers. This means that such molded foam products formed through injection molding have a large proportion of the unfoamed portions and thus advantageously have relatively high strength and heat resistance for a molded foam product. Meanwhile, molded foam products produced through injection molding have a small proportion of the foamed layer, exhibiting insufficient heat insulation as a molded foam product intended to insulate heat. One possible method to enhance the heat insulation of the molded foam product through injection molding is increasing the thickness of the molded foam product. This method, however, requires increased amounts of materials used and a large-sized injection molding machine, and thus may unfortunately increase the manufacturing cost. Hence, a method for manufacturing a container having excellent heat insulation while achieving cost reduction has been desired.

In manufacture of a molded foam product, control of foaming is important. For example, uniform formation of fine air bubbles in a resin composition is required. There is, however, high difficulty in control of foaming when molded foam products are designed to have a reduced thickness to achieve reduction in the weight and the amounts of materials used, for example. Control failure causes problems such as poor surface smoothness or generation of crinkles on the surface of the resulting molded foam products due to collision of flow fronts of the molten resin within the cavity of the mold in injection molding and significantly varying solidification timing within the cavity of the mold.

The present invention has been made in view of the above current state of the art, and aims to provide a method for manufacturing a molded foam product which can reduce or prevent blisters and crinkles on the surface even in the case of manufacturing a molded product designed to have a small thickness, thereby giving a molded foam product having excellent heat insulation while avoiding an increase in the amounts of materials used.

Solution to Problem

The inventors have focused on a method including injection molding of a molten resin. This method can produce a molded foam product having excellent heat insulation when it includes the step of moving a movable portion of a mold to increase the volume of a cavity before the molten resin injected into the cavity of the mold completely solidifies. For high heat insulation, the present inventors have also made a study on increasing the core-back process range so as to increase the thickness of the molded product while avoiding an increase in the amounts of materials used. This, however, raised problems related to the appearance, such as a low dimensional accuracy due to poor transfer of the mold pattern, and generation of blisters on the surface of the molded product. The inventors have therefore focused on enhancing heat insulation not by increasing the thickness of the entire molded product but by imparting regularly formed thick portions to the surface of the molded product. They have then found that with a mold having large gap sizes and small gap sizes in the cavity, a molded foam product having excellent heat insulation can be produced while an increase in the amounts of materials used is avoided.

Furthermore, the present inventors have made studies on blisters and crinkles generated on the surface of molded products. The studies have revealed that in the case of manufacturing a molded product having a small thickness, the fluidity of the molten resin within the cavity is low, and thus gravity and slight differences in surface roughness of the mold are likely to affect the resulting molded product. Specifically, the studies have found that the molten resin is not likely to flow evenly from the resin injection port to the periphery of the container, so that the flow fronts of the molten resin collide within the cavity and the solidification timing of the molten resin significantly varies within the cavity, generating blisters and crinkles in a wide range of the surface of the molded product. In order to solve this problem, the inventors formed first linear portions each giving a large gap size in the cavity and second linear portions each giving a small gap size in the cavity alternately in the mold in the direction from the resin injection port to the periphery of the cavity. This method has been found to reduce a decline in fluidity of the molten resin within the cavity even when the amounts of materials used are reduced. The inventors have then arrived at a method that can reduce or prevent blisters and crinkles on the surface even in the case where the fluidity of the molten resin within the cavity is high and the molded form partially include thin portions. This method can manufacture a molded foam product having excellent heat insulation while avoiding an increase in the amounts of materials used. Thereby, the inventors have completed the present invention.

The method for manufacturing a molded foam product according to the present invention includes the steps of: injecting, during injection molding, a molten resin containing a supercritical fluid or a chemical foaming agent into a cavity formed in a mold that includes a movable portion; and moving the movable portion to increase the volume of the cavity before the molten resin injected into the cavity completely solidifies, the mold alternately including, in a direction from a resin injection port to the periphery of the cavity, first linear portions each giving a large gap size in the cavity and second linear portions each giving a small gap size in the cavity.

Preferably, the first linear portions each include a linear depression formed on a surface of the mold facing the cavity and the second linear portions each include a linear projection formed on the surface of the mold facing the cavity.

Preferably, a height from the bases of the linear depressions to the vertexes of the linear projections is 0.1 mm or greater.

Preferably, the first linear portions and the second linear portions satisfy the relation Ha>Hb, where Ha represents the gap size in the cavity in each first linear portion, Hb represents the gap size in the cavity in each second linear portion, and Ha and Hb are each 0.2 mm or greater and 3.0 mm or smaller.

Preferably, Ha is 0.4 mm or greater and 3.0 mm or smaller and Hb is 0.2 mm or greater and 1.5 mm or smaller.

Preferably, the method manufactures a molded foam product that includes thick portions and thin portions alternately on its front surface and back surface.

The molded foam product of the present invention is a molded foam product formed of a resin composition, including thin portions and thick portions alternately on its front surface and back surface, the thin portions and the thick portions being formed in a direction from a resin injection port to the periphery of a container.

Advantageous Effects of Invention

The method for manufacturing a molded foam product according to the present invention can reduce or prevent blisters and crinkles on the surface even in the case of manufacturing a molded product designed to have a small thickness, thereby giving a molded foam product having excellent heat insulation while avoiding an increase in the amounts of materials used. The molded foam product of the present invention has high strength and high heat resistance, exhibits reduced or no blisters and crinkles on the surface, and has excellent heat insulation.

BRIEF DESCRIPTION OF DRAWINGS

FIG. 2(a) shows the initial state before the core-back process, and FIG. 2(b) shows an expanded state after the core-back process.

DESCRIPTION OF EMBODIMENTS

Figure 1:
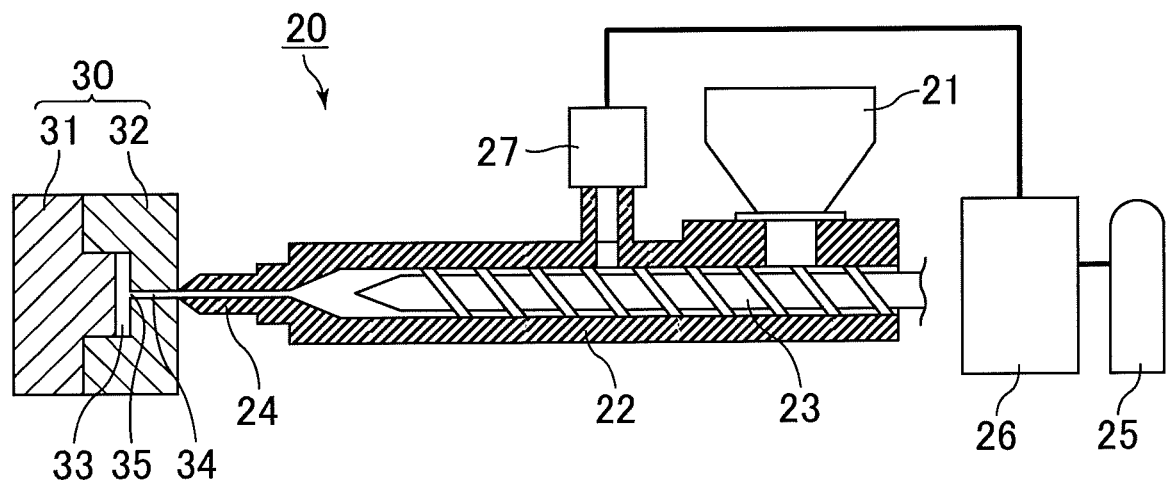
FIG. 1 is a schematic view illustrating an exemplary method for manufacturing a molded foam product using a supercritical injection molding apparatus.

The method for manufacturing a molded foam product according to the present invention includes the steps of: injecting, during injection molding, a molten resin containing a supercritical fluid or a chemical foaming agent into a cavity formed in a mold that includes a movable portion; and moving the movable portion to increase the volume of the cavity before the molten resin injected into the cavity completely solidifies, the mold alternately including, in a direction from a resin injection port to the periphery of the cavity, first linear portions each giving a large gap size in the cavity and second linear portions each giving a small gap size in the cavity.

Molded foam products herein are manufactured through injection molding of a molten resin containing a supercritical fluid or a chemical foaming agent. Examples of the molten resin containing a supercritical fluid include a molten resin composition impregnated with a supercritical fluid. Preferred is a single-phase melt of a resin composition and a supercritical fluid. Such a molten resin containing a supercritical fluid can be produced by injecting a supercritical fluid generated by a known supercritical fluid generator into a molten resin composition under high pressure, and further stirring the mixture. The supercritical fluid can be, for example, a supercritical fluid of an inert gas such as carbon dioxide, nitrogen, argon, or helium. In particular, a supercritical fluid of carbon dioxide or nitrogen is preferred, and a supercritical fluid of nitrogen is more preferred. The resin composition is described in detail below.

Examples of the molten resin containing a chemical foaming agent include those obtained by melting a resin composition containing a chemical foaming agent. The chemical foaming agent is decomposed by heat, for example, and generates gases such as carbon dioxide. Examples of the chemical foaming agent include inorganic chemical foaming agents such as sodium bicarbonate and ammonium carbonate; and organic chemical foaming agents such as azodicarbonamide and N,N'-dinitrosopentatramine. In particular, inorganic chemical foaming agents are preferred because a common injection molding machine can be used and uniform formation of fine air bubbles can be easily achieved. These inorganic chemical foaming agents may be mixed with a foaming aid such as an organic acid (e.g., citric acid) as necessary, for stable, uniform formation of fine air bubbles in the molded foam product.

The resin composition preferably contains 1 wt % or more and 10 wt % or less chemical foaming agent.

The injection molding includes injecting a molten resin containing a supercritical fluid or a chemical foaming agent into a cavity of a mold, followed by causing the resin to cool and solidify. This enables manufacture of molded products having fine and various shapes according to the shape of the cavity of the mold. Also, when the pressure onto the molten resin containing a supercritical fluid is dropped during injection molding, a phase transition of the supercritical fluid to the gaseous phase occurs, generating air bubbles in the molten resin. Thereby, a molded foam product containing fine air bubbles is obtained. With a large number of points where foaming starts (foaming points) uniformly distributed in the molten resin, the amount of air bubbles can be increased. With a chemical foaming agent, the cost of equipment is lower than that in the case of using a supercritical fluid, allowing cost reduction related to the production of a molded foam product.

The present invention includes the process of moving a movable portion of the mold to increase the volume of the cavity before the molten resin injected into the cavity completely solidifies (hereinafter, this step is also referred to as a "core-back process"). When the cavity is forcibly expanded in the state where the molten resin is partially or wholly melted, a rapid pressure drop is caused, so that the foaming amount is significantly increased. This process can generate air bubbles throughout the entire inside of the molten resin injected into the cavity. The mold typically includes a male mold having a protruding shape and a female mold having a recessed shape. The space formed by the male mold and the female mold fitted to each other constitutes the cavity into which the molten resin is injected. At least a portion of the male mold and/or the female mold is moved to increase the volume of the cavity. Here, in cases where the male mold is a movable component and the female mold is a stationary component, the entire male mold is preferably moved to increase the volume of the cavity.

The core-back process is preferably started within the range of immediately after injection of the molten resin into the cavity is completed (zero seconds after completion of the injection) to five seconds after completion of the injection. The mold is preferably moved at a moving speed (core-back process speed) of 0.1 mm/sec or faster. The expansion amount of the gap size of the mold by the core-back process (i.e., core-back process range) is preferably from 0.5 mm to 10 mm.

The production of the molten resin containing a supercritical fluid and foam molding of the molten resin can be conducted with, for example, a supercritical injection molding apparatus including an injection molding machine and a supercritical fluid generator connected to each other. Examples of the supercritical injection molding apparatus include a MuCell injection molding machine (MuCell is a registered trademark of Trexel. Co., Ltd.).

FIG. 1 is a schematic view illustrating an exemplary method for manufacturing a molded foam product using a supercritical injection molding apparatus. A supercritical injection molding apparatus 20 shown in FIG. 1 includes an injection molding machine connected to a supercritical fluid generator. The injection molding machine includes a hopper 21, a heating cylinder 22, a screw 23, and a nozzle 24. The supercritical fluid generator includes a gas bottle 25, a supercritical fluid generator 26, and an injection controller 27.

The hopper 21 includes a vessel that stores a resin material fed into the hopper 21 and drops an appropriate amount of the resin material into the heating cylinder 22 through its bottom opening, which is closable. Examples of the resin material fed into the hopper 21 include pellets of a resin composition produced by melt-kneading a mixture of ingredients with an extruder. Non-limiting examples of the extruder include uniaxial or multiaxial various extruders. Preferred are, for example, biaxial extruders whose temperature is set to 200° C. or higher. The ingredients may be kneaded batchwise, or desired ingredients may be kneaded first and then may be kneaded together with the rest of the ingredients. The heating cylinder 22 is capable of heating the inside of a cylindrical space and melting the resin material.

The gas bottle 25 encloses an inert gas which is an ingredient of the supercritical fluid. The inert gas is introduced from the gas bottle 25 to the supercritical fluid generator 26 where the gas becomes a supercritical fluid. The supercritical fluid generated in the supercritical fluid generator 26 is fed into the heating cylinder 22 through the injection controller 27. The injection controller 27 is configured to control the amount of the supercritical fluid to be injected into the resin material that is melt in the heating cylinder 22.

The screw 23 is movable while turning inside the heating cylinder 22 and is configured to push the molten resin material and the supercritical fluid, while blending them together, to the end of the heating cylinder 22. The blending produces a single-phase melt of the molten resin material and the supercritical fluid (i.e., molten resin containing a supercritical fluid). The molten resin containing a supercritical fluid is pushed and transported to the nozzle 24 by the screw 23, so that the molten resin containing a supercritical fluid is injected into the mold 30 through the nozzle 24 at an appropriate injection rate.

With the molten resin containing a chemical foaming agent, a molded foam product can be manufactured using the injection molding machine without using the supercritical fluid generator. For example, a molten resin is produced by feeding pellets of a resin composition containing a chemical foaming agent into the hopper 21 and melting the pellets in the heating cylinder 22. Here, the chemical foaming agent decomposes within the heating cylinder 22 to generate a gas such as carbon dioxide. The molten resin is then pushed and transported to the nozzle 24 by the screw 23, so that the molten resin is injected into the mold 30 through the nozzle 24 at an appropriate injection rate.

The mold 30 may include a first mold component and a second mold component that face each other across the cavity. The first mold component is, for example, a male mold 31 having a protruding shape. The second mold component is, for example, a female mold 32 having a recessed shape. The molten resin coming out of the nozzle 24 is injected into a cavity 33 through a runner 34 and the injection port 35. In the case of using a molten resin containing a supercritical fluid, the pressure is dropped in the mold 30, and when the pressure reaches the critical pressure, a phase transition of the supercritical fluid to the gaseous phase occurs, generating air bubbles in the molten resin. In the case of using a molten resin containing a chemical foaming agent, the pressure drop in the mold 30 causes gases such as carbon dioxide generated in the molten resin to increase in volume and thereby foam.

Figure 2:
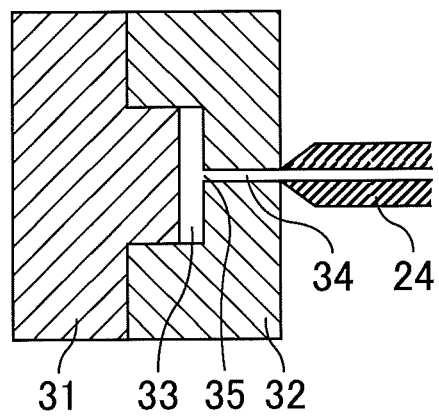
FIG. 2 includes enlarged schematic cross-sectional views of a portion including the cavity of the mold shown in FIG. 1 for illustration of a core-back process.
Figure 2:
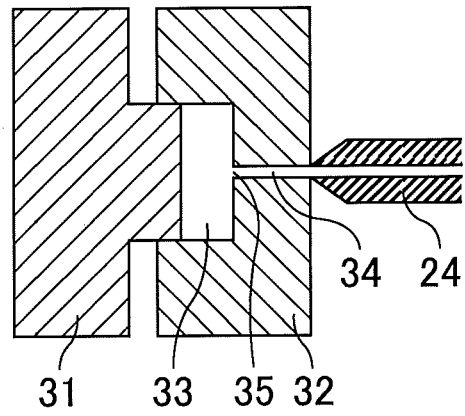

Then, as shown in FIG. 2, the male mold 31 is moved back before the molten resin cools and solidifies, so that the cavity 33 is expanded, i.e., the core-back process is performed. This accelerates the pressure drop in the mold and thereby accelerates foaming in the molten resin in the cavity 33. FIG. 2 includes enlarged schematic cross-sectional views of a portion including the cavity of the mold shown in FIG. 1 for illustration of the core-back process; FIG. 2(*a*) shows the initial state before the core-back process, and FIG. 2(*b*) shows an expanded state after the core-back process.

The mold 30 alternately includes, in the direction from a resin injection port to the periphery of the cavity, first linear portions each giving a large gap size in the cavity and second linear portions each giving a small gap size in the cavity. With such portions giving a large gap size in the cavity and a small gap size in the cavity formed alternately, the molten resin can be spread to the periphery of the cavity even in the case of manufacturing a molded foam product having a small thickness while a decline in the fluidity of the molten resin is avoided. Also, since the first linear portions and the second linear portions are formed in the direction from the resin injection port to the periphery of the cavity, the molten resin flows along the first linear portions and the second linear portions within the cavity 33 and thus more easily reaches the periphery of the mold. The first linear portions and the second linear portions may be formed partially between a resin injection port 35 and the periphery of the cavity 33 as long as they are formed in the direction from the resin injection port 35 to the periphery of the cavity 33.

Figure 3:
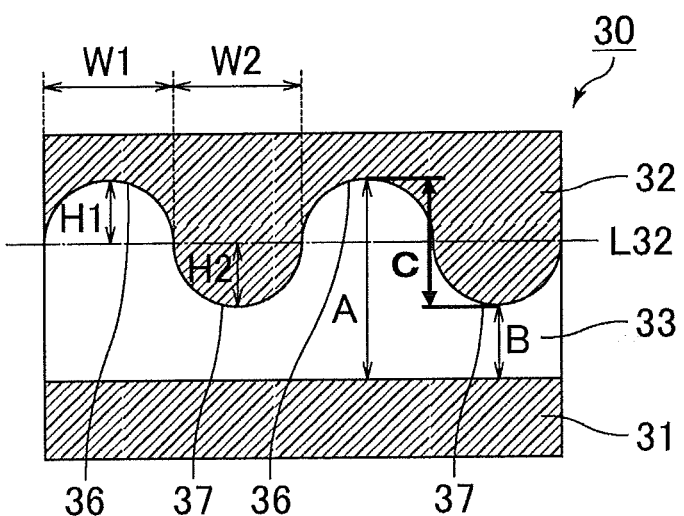
FIG. 3 includes schematic cross-sectional views of a mold including linear depressions and linear projections on one of its mold components.
Figure 3:
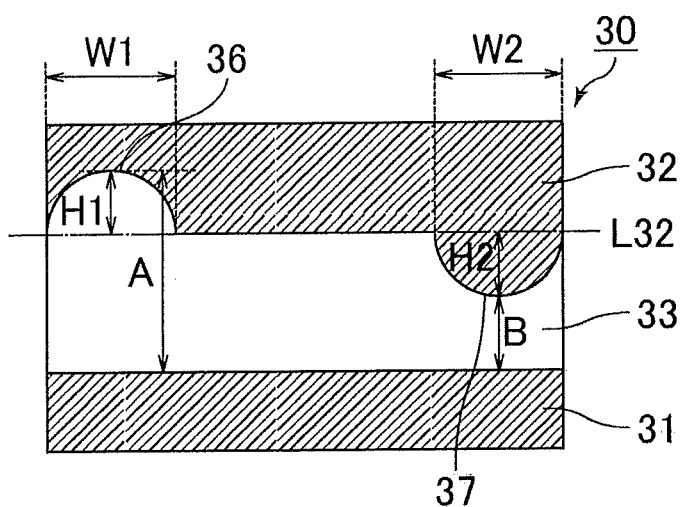
Figure 3:
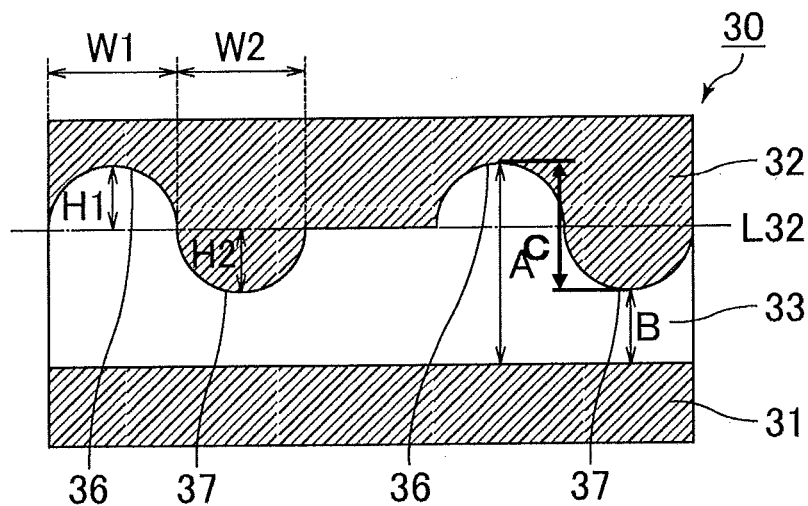

Preferably, the first linear portions each include a linear depression 36 formed on the surface of the mold 30 facing the cavity 33 and the second linear portions each include a linear projection 37 formed on the surface of the mold 30 facing the cavity 33. FIG. 3 includes schematic cross-sectional views of a mold including linear depressions and linear projections on one of its mold components. As shown in FIG. 3(*a*), for example, the linear depressions 36 and the linear projections 37 may alternately be formed consecutively on the surface of the female mold 32 facing the cavity 33. Also, as shown in FIG. 3(*b*) and FIG. 3(*c*), for example, the linear depressions 36 and the linear projections 37 may be formed with spaces in between on the surface of the female mold 32 facing the cavity 33. In the cases shown in FIGS. 3(*a*) to 3(*c*), the first linear portions each include a linear depression 36 formed on the female mold 32 and the corresponding portion of the flat surface of the male mold 31, and the second linear portions each include a linear projection 37 formed on the female mold 32 and the corresponding portion of the flat surface of the male mold 31.

Figure 4:
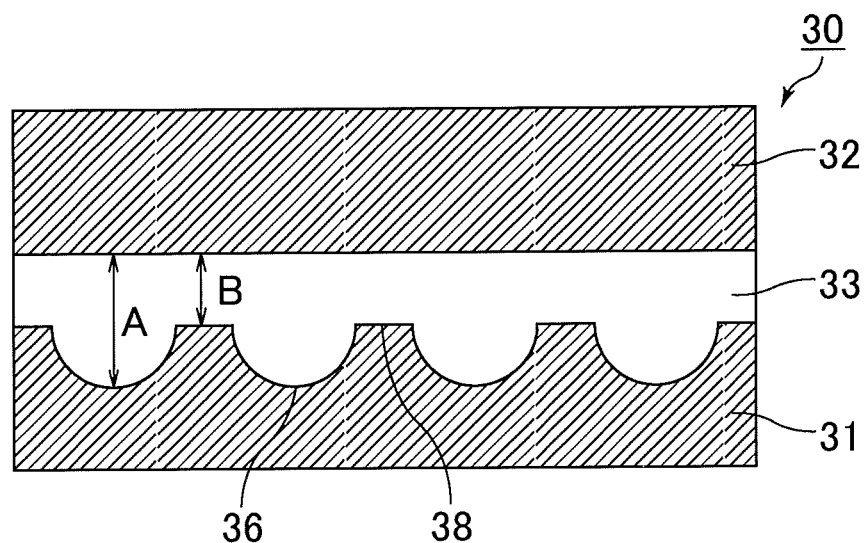
FIG. 4 is a schematic cross-sectional view of a mold including linear depressions on one of its mold components.

Preferably, the first linear portions each include a linear depression 36 formed on the surface of the mold 30 facing the cavity 33 and the second linear portions each include a linear flat portion 38 formed on the surface of the mold 30 facing the cavity 33. FIG. 4 is a schematic cross-sectional view of a mold including linear depressions on one of its mold components. As shown in FIG. 4, for example, the linear depressions 36 may be formed consecutively on the surface of the male mold 31 facing the cavity 33. In this case, the first linear portions each include a linear depression 36 formed on the male mold 31 and the corresponding portion of the flat surface of the female mold 32, and the second linear portions each include a linear flat portion 38 formed on the male mold 31 and the corresponding portion of the flat surface of the female mold 32. The linear flat portions 38 are each formed between two adjacent linear depressions 36 when, for example, multiple linear depressions 36 are formed at a constant pitch on the surface of the mold.

Figure 5:
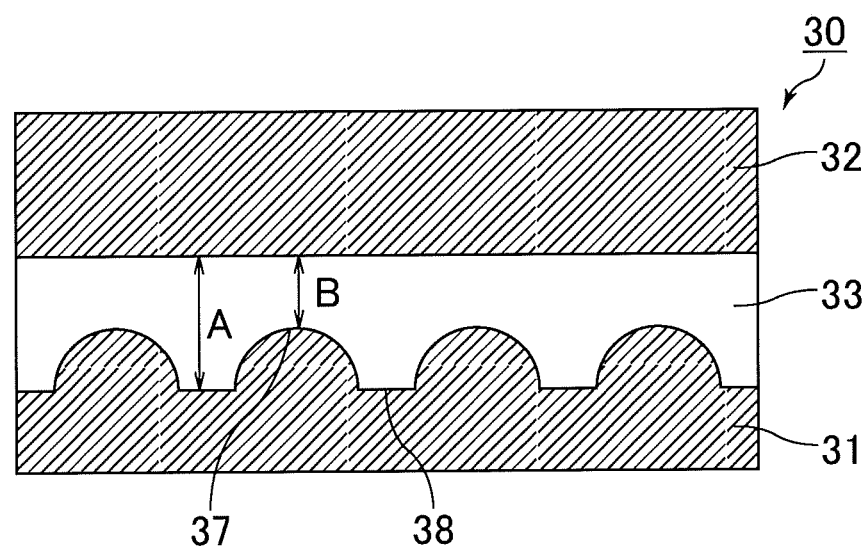
FIG. 5 is a schematic cross-sectional view of a mold including linear projections on one of its mold components.

Preferably, the first linear portions each include a linear flat portion 38 formed on the surface of the mold 30 facing the cavity 33 and the second linear portions each include a linear projection 37 formed on the surface of the mold 30 facing the cavity 33. FIG. 5 is a schematic cross-sectional view of a mold including linear projections on one of its mold components. As shown in FIG. 5, for example, the linear projections 37 may be formed consecutively on the surface of the male mold 31 facing the cavity 33. In this case, the first linear portions each include a linear flat portion 38 formed on the male mold 31 and the corresponding portion of the flat surface of the female mold 32, and the second linear portions each include a linear projection 37 formed on the male mold 31 and the corresponding portion of the flat surface of the female mold 32. The linear flat portions 38 are each formed between two adjacent linear projections 37 when, for example, multiple linear projections 37 are formed at a constant pitch on the surface of the mold.

The linear depressions 36, the linear projections 37, and the linear flat portions 38 shown in FIGS. 3 to 5 may each be formed on the surface of the male mold 31 or the female mold 32. The linear depressions 36, the linear projections 37, and the linear flat portions 38 need to be formed on the surface of at least one of the first mold component (male mold 31) and the second mold component (female mold 32) of the mold 30 facing the cavity 33, and may be formed on the surface of each of the first mold component (male mold 31) and the second mold component (female mold 32) facing the cavity 33.

Figure 6:
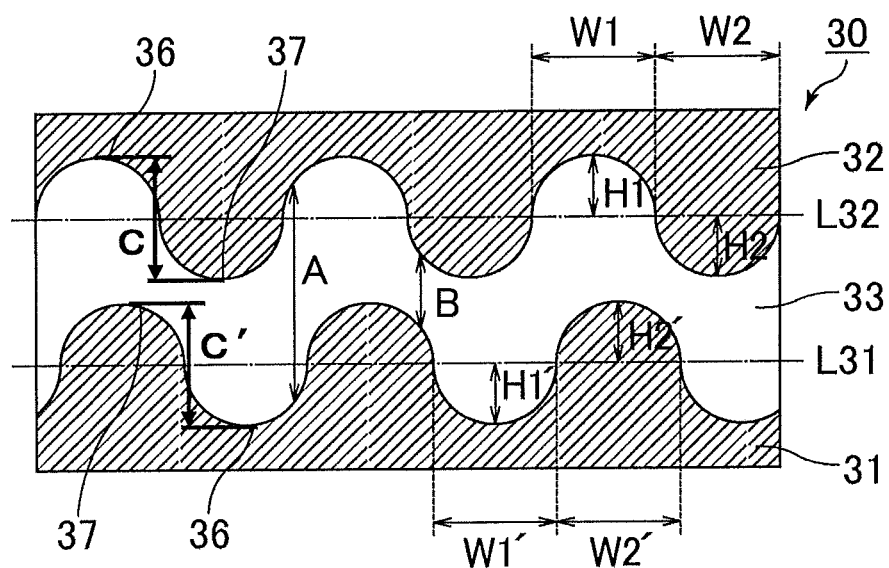
FIG. 6 includes schematic cross-sectional views of a mold including linear depressions and linear projections on both of its mold components.
Figure 6:
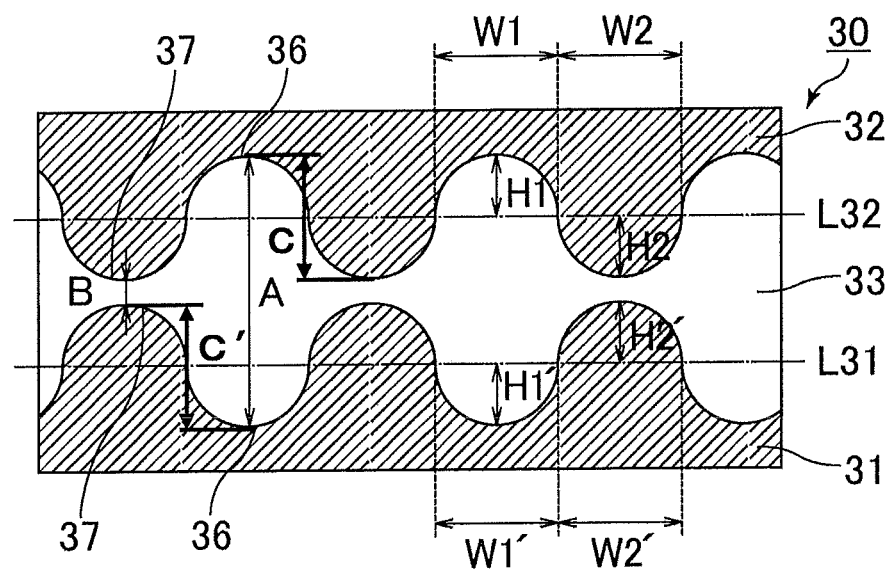

FIG. 6 includes schematic cross-sectional views of a mold including linear depressions and linear projections on both of its mold components. As shown in FIG. 6(*a*), the first mold component and the second mold component may be disposed such that the bases of their linear depressions 36 are shifted from each other and the vertexes of their linear projections 37 are shifted from each other. Also, as shown in FIG. 6(*b*), the first mold component and the second mold component may be disposed such that the bases of their linear depressions 36 match each other and the vertexes of their linear projections 37 match each other. In FIGS. 6(*a*) and 6(*b*), the first linear portions each include a linear depression 36 formed on the male mold 31 and the corresponding linear depression 36 formed on the female mold 32, and the second linear portions each include a linear projection 37 formed on the male mold 31 and the corresponding linear projection 37 formed on the female mold 32.

The cross-sectional shape of each linear depression 36 taken along a plane perpendicular to the extension direction of the linear depression 36 and the cross-sectional shape of each linear projection 37 taken along a plane perpendicular to the extension direction of the linear projection 37 may each have, as shown in FIGS. 3 to 6, a shape including a curve (e.g., semicircle or shape with an arc) or a shape consisting of straight lines, such as a polygon (e.g., triangle, quadrangle).

The gap size of the mold 30, in the cavity 33 defining the shape of a molded foam product 100, defines the thickness of the molded foam product. The mold having a gap size smaller than 0.2 mm may fail to cause sufficient foaming in the molten resin, producing a product that includes an unfoamed portion with no air bubbles. An unfoamed portion has no effect of heat insulation owing to air bubbles and thus exhibits insufficient heat insulation.

Also, the molded foam product 100, when uncolored, typically appears white because light is scattered by air bubbles, whereas the unfoamed portion appears opaque or has a low degree of whiteness. This means that formation of an unfoamed portion gives a non-uniform appearance to the molded foam product 100. The mold preferably has a gap size of 3 mm or smaller. In portions of the mold where the gap size is greater than 3 mm, the time required for cooling and solidification is longer. With such a portion, the molded foam product 100 may be deformed in ejection of the molded product from the mold 30 or due to foam residues (foamable portions in the molten resin which has insufficiently solidified). Also, foaming comparatively easily occurs in such a portion. Hence, with a gap size greater than 3 mm, the mold configuration of the present invention will be less advantageous. The first linear portions and the second linear portions therefore preferably satisfy the relation Ha>Hb, where Ha represents the gap size in the cavity in each first linear portion, Hb represents the gap size in the cavity in each second linear portion, and Ha and Hb are each 0.2 mm or greater and 3.0 mm or smaller.

In FIG. 3 to FIG. 6, the letter A indicates the maximum gap size of the mold 30 within the cavity 33 before the core-back process, and the letter B indicates the minimum gap size of the mold 30 within the cavity 33 before the core-back process. The gap size A is preferably 0.4 mm or greater and 3.0 mm or smaller, while the gap size B is preferably 0.2 mm or greater and 1.5 mm or smaller. In other words, Ha is more preferably 0.4 mm or greater and 3.0 mm or smaller, while Hb is more preferably 0.2 mm or greater and 1.5 mm or smaller.

Figure 7:
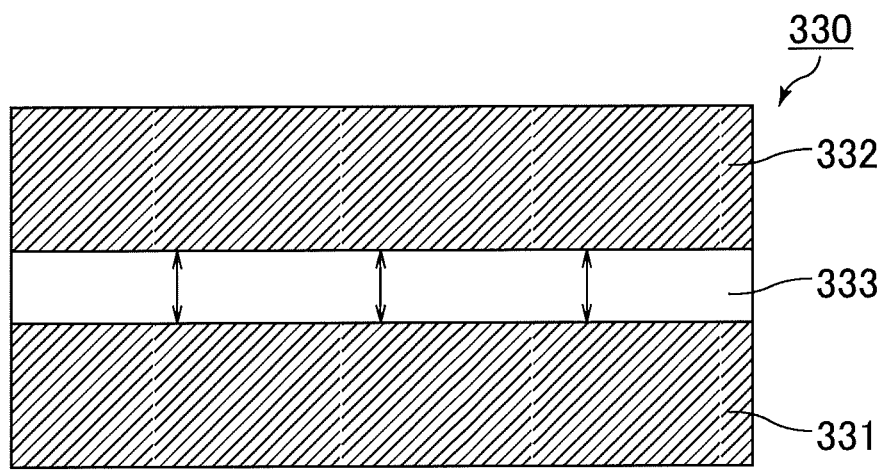
FIG. 7 includes schematic cross-sectional views of a mold provided with a constant gap size in the cavity.
Figure 7:
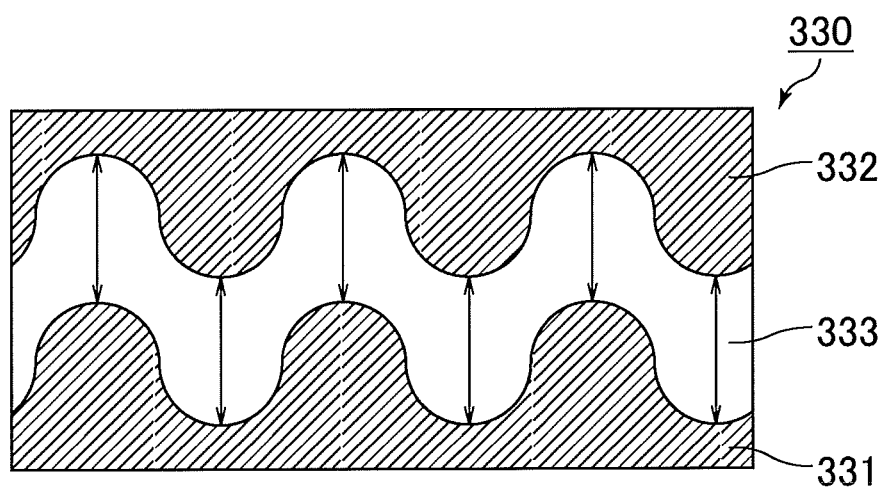

If the portions each giving a large gap size in the cavity and the portions each giving a small gap size in the cavity are not formed alternately, a molded foam including thin portions and thick portions alternately on its front surface and back surface cannot be obtained, and the molded foam fails to have sufficient heat insulation. FIG. 7 includes schematic cross-sectional views of a mold provided with a constant gap size in the cavity. In either of the case where neither a first mold component 331 nor a second mold component 332 of a mold 330 includes any linear portion as shown in FIG. 7(a) or the case where both the first mold component 331 and the second mold component 332 of the mold 330 include linear portions as shown in FIG. 7(b), a molded foam having sufficient heat insulation cannot be obtained with a constant gap size in the cavity indicated by the double-headed arrows.

The cross-sectional area of a linear depression 36 perpendicular to the extension direction of the linear depression 36 is preferably the same as the cross-sectional area of a linear projection 37 perpendicular to the extension direction of the linear projection 37. This configuration enables manufacture of a container having excellent heat insulation while avoiding an increase in the amounts of materials used and avoiding a decline in the fluidity of the resin. In cases where multiple linear depressions 36 are formed, the cross-sectional area of a linear depression 36 is construed as the average cross-sectional area of the linear depressions 36. In cases where multiple linear projections 37 are formed, the cross-sectional area of a linear projection 37 is construed as the average cross-sectional area of the linear projections 37. The expression "cross-sectional area of a linear depression is the same as the cross-sectional area of a linear projection" encompasses cases where the cross-sectional areas are completely the same, and cases where the cross-sectional area of the linear projections falls within the range of ±10% of the cross-sectional area of the linear depressions.

In FIG. 3 and FIG. 6, L31 is the reference line for the male mold 31 and L32 is the reference line for the female mold 32. In the case where the linear depressions 36 and the linear projections 37 are formed consecutively as shown in FIG. 3, FIG. 6(a), and FIG. 6(b), the reference lines L31 and L32 are each a centerline connecting the midpoints of the distances from the bases of the depressions to the vertexes of the projections. In the case where a flat portion is formed between a linear depression 36 and a linear projection 37 as shown in FIGS. 3(b) and 3(c), the reference line L32 is a line connecting the surface points of the flat portions. The cross-sectional area of a linear depression 36 and the cross-sectional area of a linear projection 37 are preferably symmetrically the same about the reference line.

In the case where the linear depressions 36 and the linear projections 37 have a semicircular cross-sectional shape, the cross-sectional area of the linear depressions 36 and the cross-sectional area of the linear projections 37 can be calculated by the following method, for example. The cross-sectional area of the linear depressions 36 can be calculated using, for example, a distance H1 from the centerline to the base of a linear depression 36 and a distance W1 between intersections of the centerline and the ends of the linear depression 36 as shown in FIG. 3. The cross-sectional area of the linear projections 37 can be calculated using, for example, a distance H2 from the centerline to the vertex of a linear projection 37 and a distance W2 between intersections of the centerline and the ends of the linear projection 37 as shown in FIG. 3. In FIG. 6, the distances H1', W1', H2', and W2' of the male mold 31 correspond to the distances H1, W1, H2, and W2 of the female mold 32, respectively. The distances H1', W1', H2', and W2' of the male mold 31 are preferably the same as the distances H1, W1, H2, and W2 of the female mold 32, respectively. In the case where multiple linear depressions 36 are formed, the distances H1, W1, H1', and W1' are each the average of the corresponding values for the linear depressions 36. In the case where multiple linear projections 37 are formed, the distances H2, W2, H2', and W2' are each the average of the corresponding values for the linear projections 37.

In the case where the linear depressions 36 and the linear projections 37 have a cross-sectional shape including an arc with a radius R other than a semicircular cross-sectional shape or have a polygonal (e.g., triangular, quadrangular) cross-sectional shape, a reference line connecting the midpoints of the distances from the bases of the depressions to the vertexes of the projections is set for the cross-sectional shape. Based on the reference line, the cross-sectional area of the linear depressions 36 and the cross-sectional area of the linear projections 37 can be calculated.

In FIG. 3 and FIG. 6, the letter C indicates the height from the bases of the linear depressions to the vertexes of the linear projections. In FIG. 6, the height C' of the male mold 31 corresponds to the height C of the female mold 32. In the case where the linear depressions 36 and the linear projections 37 are alternately formed consecutively, the height C and the height C' from the base of a linear depressions 36 to the vertex of a linear projection 37 are each preferably 0.1 mm or higher. If the height is lower than 0.1 mm, the fluidity of the molten resin may decline and the molten resin may not spread to the periphery of the cavity. The upper limit of the height is preferably 1.5 mm. If the height is higher than 1.5 mm, there may be a great difference in fluidity between the depressions and the projections, which may form weld marks around the projections. In the case where multiple linear depressions 36 and multiple linear projections 37 are formed, the height is the average height from the bases of the linear depressions 36 to the vertexes of the linear projections. The height C and the height C' may be the same as or different from each other.

Figure 8:
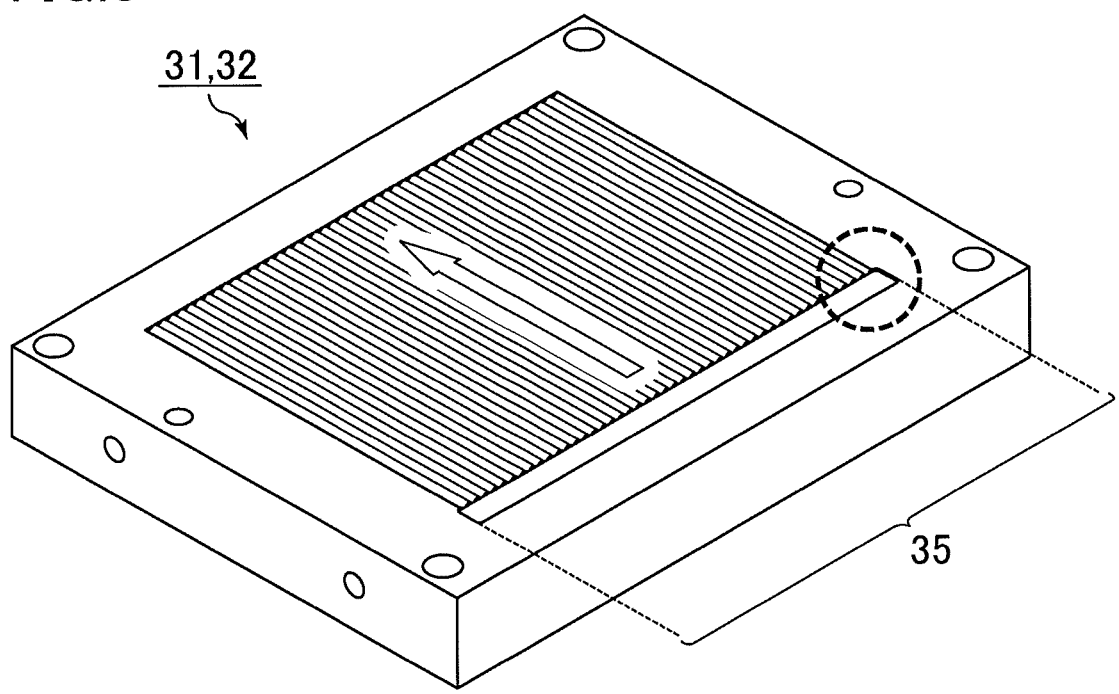
FIG. 8 is a perspective view schematically showing a mold used to manufacture a molded foam product having a plate shape.
Figure 9:
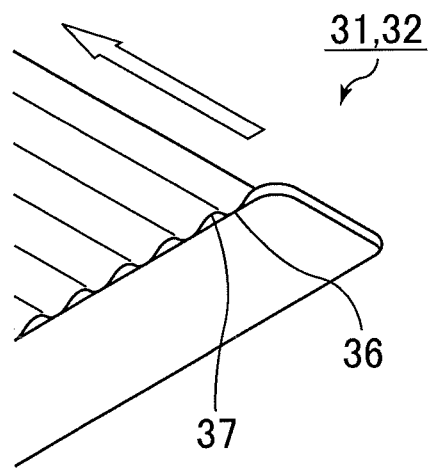
FIG. 9 is an enlarged schematic view of the portion surrounded by a dotted line in FIG. 8.
Figure 10:
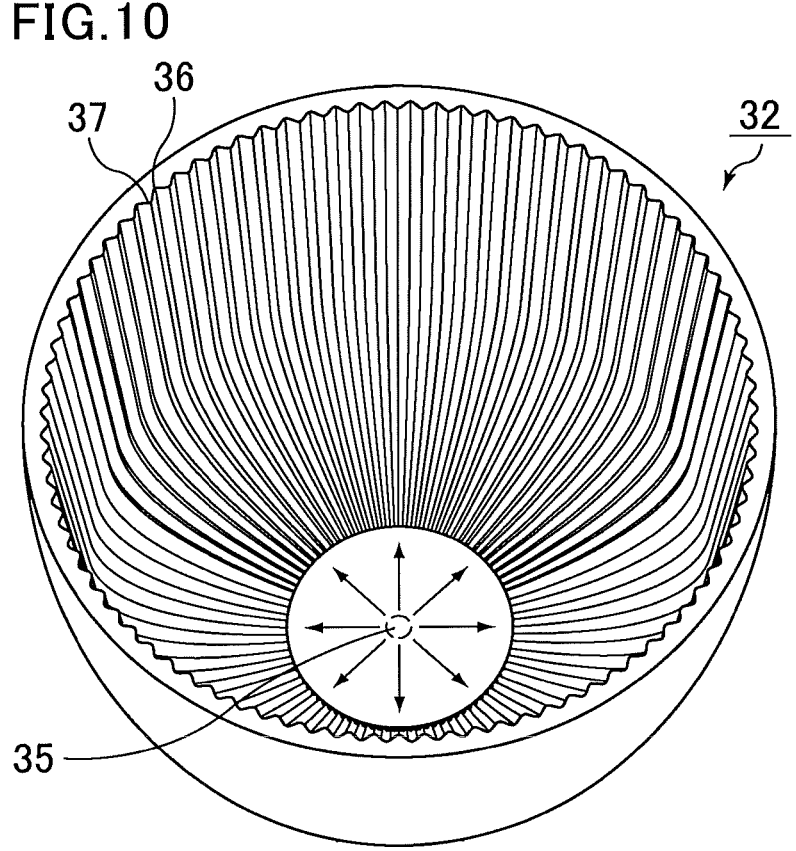
FIG. 10 is a perspective view schematically showing a mold used to manufacture a molded foam product having a container shape.
Figure 11:
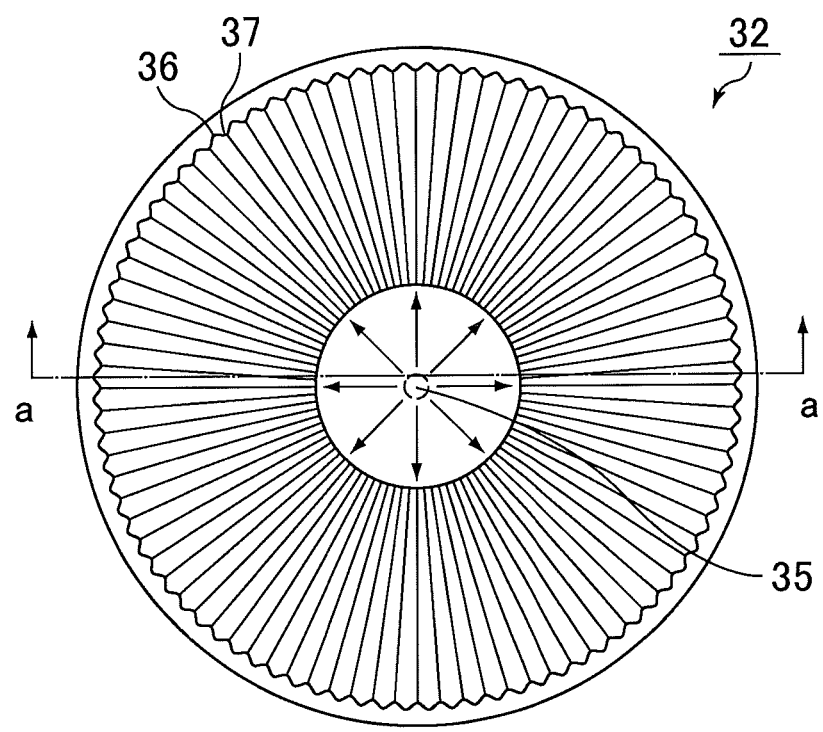
FIG. 11 is a schematic plan view of the mold shown in FIG. 10.
Figure 12:
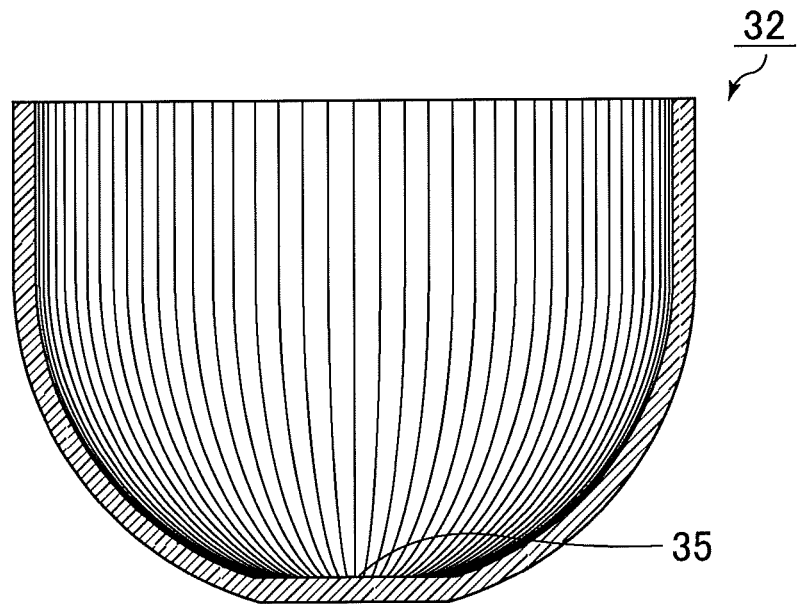
FIG. 12 is a schematic cross-sectional view of the mold shown in FIG. 11 which is taken along the line a-a.

The overall shape of the mold 30 can be modified according to the desired shape of the resulting molded foam product. Examples of the shape of the molded foam product include a plate shape and a container shape. Hereinafter, the configuration of the mold 30 is described with reference to FIG. 8 to FIG. 12. FIG. 8 is a perspective view schematically showing a mold used to manufacture a molded foam product having a plate shape. FIG. 9 is an enlarged schematic view of the portion surrounded by a dotted line in FIG. 8. FIG. 10 is a perspective view schematically showing a mold used to manufacture a molded foam product having a container shape. FIG. 11 is a schematic plan view of the mold shown in FIG. 10. FIG. 12 is a schematic cross-sectional view of the mold shown in FIG. 11 which is taken along the line a-a. The arrows in FIG. 8, FIG. 10, and FIG. 11 each indicate the extension direction of the linear depressions 36 and the linear projections 37.

The mold used to manufacture a molded foam product having a plate shape can be, for example, a mold whose resin injection port is a film gate. In a mold whose resin injection port is a film gate, as shown in FIG. 8 and FIG. 9, the molten resin injected through the resin injection port 35 flows linearly along the linear depressions 36 and the linear projections 37. The mold used to manufacture a container-shaped molded foam product can be, for example, a mold whose resin injection port is a pin gate. In a mold whose resin injection port is a pin gate, as shown in FIG. 10 and FIG. 11, the molten resin injected through the resin injection port 35 flows radially along the linear depressions 36 and the linear projections 37.

Figure 13:
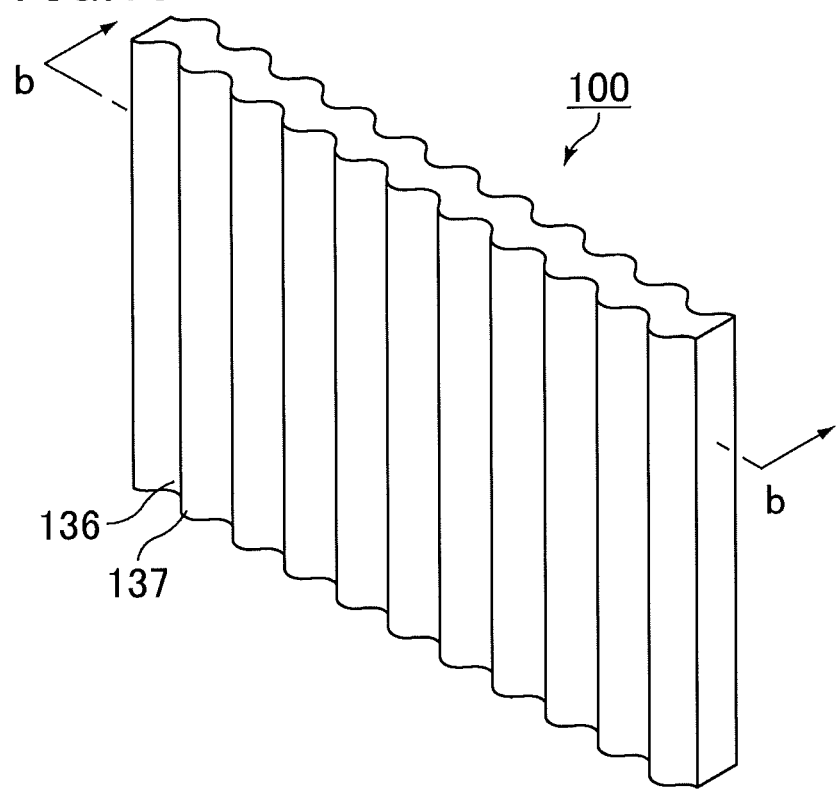
FIG. 13 is a perspective view schematically showing an exemplary molded foam product manufactured using the mold shown in FIG. 8.
Figure 14:
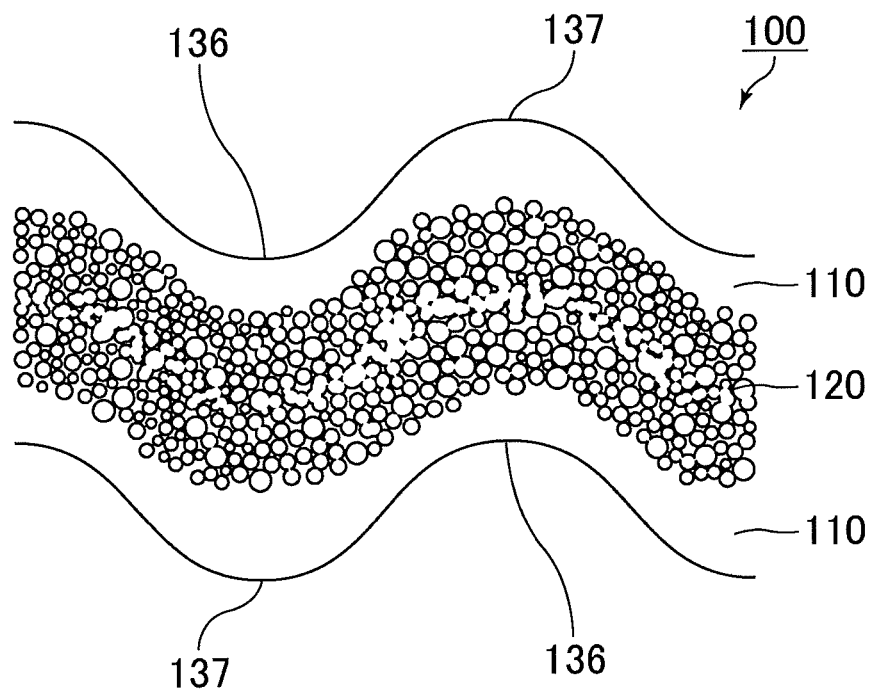
FIG. 14 is a partial enlarged schematic cross-sectional view of the molded foam product shown in FIG. 13 which is taken along the line b-b.

The method for manufacturing a molded foam product according to the present invention can manufacture a molded foam product including thin portions and thick portions alternately on its front surface and back surface. Also, the molded foam product of the present invention is formed of a resin composition, and includes thick portions and thin portions alternately on its front surface and back surface, the thick portions and the thin portions being formed in the direction from the resin injection port to the periphery of a container. FIG. 13 is a perspective view schematically showing an exemplary molded foam product manufactured using the mold shown in FIG. 8. FIG. 14 is a partial enlarged schematic cross-sectional view of the molded foam product shown in FIG. 13 which is taken along the line b-b. As shown in FIG. 13, the molded foam product 100 includes thin portions 136 and thick portions 137 alternately on its front surface and back surface. The molded foam product 100 is manufactured with the mold 30 including the linear depressions 36 and the linear projections 37 only on the female mold 32 as shown in FIG. 3(*a*). Even with a mold including the linear depressions 36 and the linear projections 37 formed only on one of its mold components, the molded foam product 100 obtained through foaming by the core-back process include the thin portions 136 and the thick portions 137 alternately on its front surface and back surface. The present invention enables reduction in blisters and crinkles on the surface even in the case of producing a molded foam product having a small thickness, and thus enables manufacture of the molded foam product 100 having a light weight and excellent heat insulation compared with conventional molded foam products.

The molded foam product 100 has a cross-sectional structure in which, as shown in FIG. 14, a foamed layer 120 is sandwiched between skin layers (outer skin layers) 110 constituting the surfaces of the molded foam product 100. The foamed layer 120 refers to a region containing a large number of air bubbles (foamed particles) in the resin. The skin layers 110 each refer to a region containing no air bubbles. The molded foam product 100 has a high strength and a smooth surface owing to the skin layers 110 on its surface. The molded foam product 100 not only has a reduced weight but also is less heat conductive owing to the foamed layer 120 in the center portion, and therefore has excellent heat resistance. The molded foam product 100 shown in FIG. 14 is an exemplary molded foam product manufactured by the method of the present invention. Molded foam products manufactured by the method of the present invention may have any structure other than the three-layer structure of the skin layer 110/the foamed layer 120/the skin layer 110.

The foamed layer 120 preferably contains 100 or more foamed particles in a 1 mm×1 mm region of the foamed layer 120 in observation of a cross section of the molded foam product 100. Any randomly selected 100 foamed particles preferably have an average particle size of 100 μm or smaller. The foamed particles can be measured with a scanning electron microscope (SEM) such as "S-4800" available from Hitachi High-Technologies Corporation.

Any decoration such as patterns, colors, or letters may be provided to the surface or any other part of the molded foam product 100. In the case of providing such decoration, additives such as pigment filler and a color masterbatch can be added to the resin composition described below.

The molded foam product 100 manufactured by the method of the present invention may be used without any limitation. Yet, since the molded foam product 100 is excellent in heat resistance and heat insulation and have a light weight, it is suitable as, for example, a product such as food containers, daily necessities, and home appliances. In particular, the molded foam product 100 is suitable as a food container. The heat resistance of the molded foam product passes the following JIS S2029 tests: 7.4 Heat resistance test (heat-resistant temperature on the label: 120° C.); 7.10 Test of suitability for high frequency of microwave oven; and 7.11 Test of durability in a microwave oven. Hence, food containers formed of the molded foam product can be heated in a microwave or used for microwave cooking.

Figure 15:
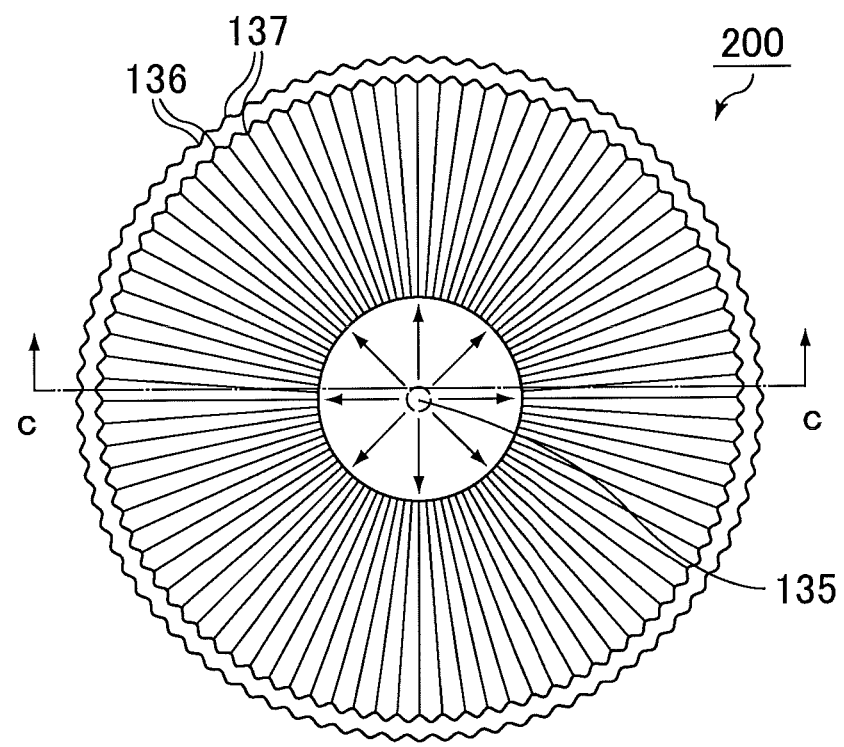
FIG. 15 is a schematic plan view of an exemplary molded foam product manufactured using the mold shown in FIG. 10.
Figure 16:
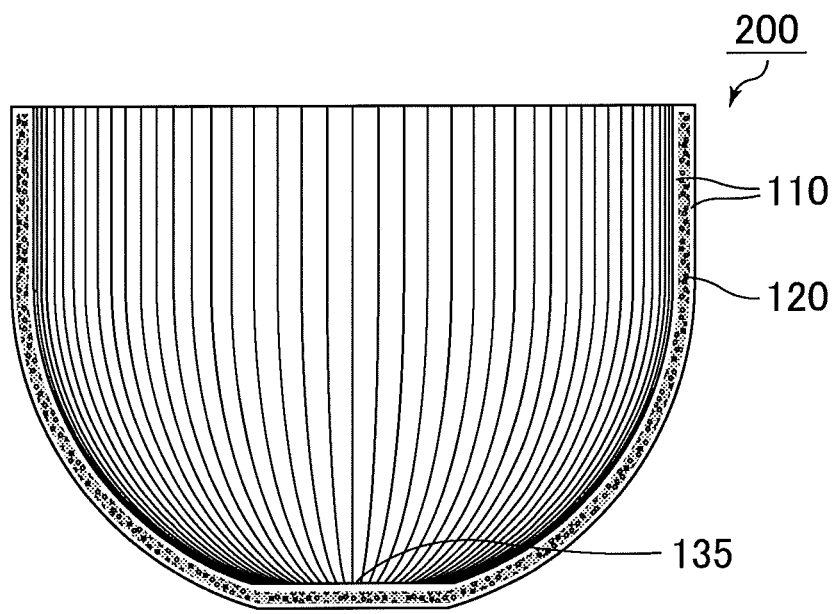
FIG. 16 is a schematic cross-sectional view of the molded foam product shown in FIG. 15 which is taken along the line c-c.

The following describes the case where the molded foam product 100 is molded as a food container 200. FIG. 15 is a schematic plan view of an exemplary molded foam product manufactured using the mold shown in FIG. 10. FIG. 16 is a schematic cross-sectional view of the molded foam product shown in FIG. 15 which is taken along the line c-c. The food container 200 includes, as shown in FIG. 15, the thin portions 136 and the thick portions 137 alternately on its front surface and back surface, the thin portions 136 and the thick portions 137 being formed in the direction from the resin injection port 135 to the periphery of the container. The food container 200 has a cross-sectional structure in which, as shown in FIG. 16, the foamed layer 120 is sandwiched between the skin layers (outer skin layers) 110 constituting the surfaces of the food container 200.

The food container 200 may have any overall shape such as a semicircular shape as shown in FIG. 15 and FIG. 16, a conical shape, or a shape having a trapezoidal cross section.

The thermoplastic resin composition is described in detail below.

The resin composition used is preferably a thermoplastic resin composition. In particular, a mixture of a polyolefin and a polylactic acid is suitable as the thermoplastic resin composition. The polyolefin and the polylactic acid are immiscible polymers which do not dissolve in each other and, when blended with each other, form an interface between them without dissolving in each other. Such an interface can therefore be utilized as a point where foaming starts (foaming point) in foaming using a supercritical fluid. Meanwhile, in order to manufacture a uniformly foamed molded foam product, the components need to be uniformly dispersed in the resin composition before foaming. Addition of a modified polyolefin containing a carbonyl group makes the polyolefin and the polylactic acid miscible with each other, increasing the dispersibility. This process produces a large number of fine air bubbles (foamed particles having a small particle size) uniformly inside the molded foam product, enabling manufacture of a molded foam product excellent in properties such as heat resistance, strength, and lightness.

The polyolefin may contain one or both of polypropylene and polyethylene. The polypropylene has a melt mass-flow rate (MFR) of preferably from 5 to 100 g/10 min, more preferably from 10 to 50 g/10 min. The MFR of polypropylene is a value measured at a temperature of 230° C. and a load of 21.2 N in accordance with JIS K7210. The polyethylene has an MFR of preferably from 5 to 100 g/10 min, more preferably from 10 to 50 g/10 min. The MFR of polyethylene is a value measured at a temperature of 190° C. and a load of 21.2 N in accordance with JIS K7210.

The polyolefin may contain at least one of polypropylene and polyethylene alone, or may also contain polyolefin polymers other than polypropylene and polyethylene.

Examples of the other polyolefin species include α-olefin homopolymers, ethylene-propylene copolymers, ethylene-α-olefin copolymers, and propylene-α-olefin copolymers. Examples of the α-olefin include C4-C12 α-olefins such as 1-butene, 1-pentene, 3-methyl-1-butene, 1-hexene, 3-methyl-1-pentene, 4-methyl-1-pentene, 3-ethyl-1-pentene, 1-octene, 1-decene, and 1-undecene.

The polyolefin preferably has a melt viscosity (220° C.) of 150 Pa·S or more and 400 Pa·S or less. The lower limit of the melt viscosity of the polyolefin is more preferably 200 Pa·S, and the upper limit thereof is more preferably 300 Pa·S. The melt viscosity can be measured with a "flow tester CFT-500D" available from Shimadzu Corporation, for example. Specifically, the viscosity characteristics can be evaluated by heating the resin under measurement to a given temperature to fluidize the resin, extruding the resin out of a cylinder through a capillary die (inner diameter: φ1 mm, length: 10 mm) using a piston at a given surface pressure (1 MPa), and measuring the distance and time for the piston movement.

The resin composition contains preferably 30 wt % or more and 80 wt % or less polyolefin. If the resin composition contains less than 30 wt % polyolefin, the resin composition may exhibit poor fluidity, decreased solidification speed, and poor moldability. If the resin composition contains more than 80 wt % polyolefin, the resin composition may exhibit poor foamability to give protrusions and recesses to the surface of the resulting molded foam product, spoiling the appearance. Also, in the case of blending the resin composition and a supercritical fluid, the resin composition is less likely to be impregnated with the supercritical fluid. The lower limit of the amount of the polyolefin in the resin composition is more preferably 35 wt %, and the upper limit thereof is more preferably 70 wt %.

The polylactic acid is an L-lactic acid or D-lactic acid homopolymer, an L-lactic acid/D-lactic acid copolymer, or any mixture of such homopolymers and copolymers. The crystallinity of the polylactic acid can be adjusted by copolymerizing (e.g., random, block, graft copolymerizing) lactic acid enantiomers with different enantiomeric ratios or by adding a crystal nucleating agent.

The polylactic acid preferably has a melt viscosity (220° C.) of 150 Pa·S or more and 400 Pa·S or less. The lower limit of the melt viscosity of the polylactic acid is more preferably 200 Pa·S, and the upper limit thereof is more preferably 300 Pa·S. The melt viscosity of the polylactic acid can be measured by a procedure similar to that of measuring the melt viscosity of the polyolefin.

The resin composition contains preferably 3 wt % or more and 40 wt % or less polylactic acid. If the resin composition contains less than 3 wt % polylactic acid, the molded foam product obtained by foam molding the resin composition may be in an insufficiently foamed state. If the resin composition contains more than 40 wt % polylactic acid, the resin composition may exhibit poor fluidity, decreased solidification speed, and poor moldability. The lower limit of the amount of the polylactic acid in the resin composition is more preferably 8 wt %, and the upper limit thereof is more preferably 30 wt %.

With the amounts of the polyolefin and the polylactic acid falling within the ranges of 30 to 80 wt % and of 3 to 40 wt %, respectively, the fluidity of the resin composition can be adjusted, and the resin composition can exhibit favorable moldability.

The difference in melt viscosity between the polyolefin and the polylactic acid is preferably 200 Pa·S or less. With a difference in melt viscosity between the polyolefin and the polylactic acid of 200 Pa·S or less, these components can be more easily blended. The upper limit of the difference in melt viscosity between the polyolefin and the polylactic acid is more preferably 150 Pa·S.

The process of blending polymers immiscible with each other may be a process in which a chemical bond is formed between the components or a process in which a crosslinked structure is formed between polymers of the same species. In the case of obtaining a molded foam product using a polylactic acid, reactive extrusion (reactive processing) may be employed in which, for example, the composition is kneaded while a polylactic acid is synthesized using additives; such as a synthetic catalyst (e.g., metal complex) and a radical generator. In the case of utilizing the interfaces between the polyolefin and the polylactic acid as points where foaming starts, addition of additives such as a synthetic catalyst and a radical generator to the resin composition is not necessary, unlike the reactive extrusion in which the composition is kneaded while the polylactic acid is synthesized. Examples of the reactive extrusion of a polylactic acid include a process in which L-lactide and ε-caprolactone are reacted using tin(II) 2-ethylhexanoate serving as the synthetic catalyst and an antioxidant (e.g., IRGANOX 1010 available from Ciba Specialty Chemicals); a process in which a polylactic acid and polyethylene glycol are reacted using a radical generator such as dicumyl peroxide; and a process in which a polymer such as polycarbonate, polybutylene adipate terephthalate (PBAT), polycaprolactone (PCL), polybutylene succinate (PBS), or polybutylene succinate adipate (PBSA) is graft-polymerized onto a polylactic acid using a radical generator.

The resin composition may contain the modified polyolefin containing a carbonyl group in a molecule. Examples of the modified polyolefin containing a carbonyl group in a molecule include those obtained by addition reaction of a polyolefin with an unsaturated carboxylic acid, an ester of an unsaturated carboxylic acid, or an anhydride of an unsaturated carboxylic acid. Examples of the unsaturated carboxylic acid include maleic acid, fumaric acid, and itaconic acid. Examples of the ester of an unsaturated carboxylic acid include monomethyl maleate, monoethyl maleate, diethyl maleate, and monomethyl fumarate. Examples of the anhydride of an unsaturated carboxylic acid include itaconic anhydride and maleic anhydride. Examples of the modified polyolefin containing a carbonyl group in a molecule include maleic anhydride-modified polyolefins and glycidyl methacrylate-modified polyolefins. These modified polyolefins containing a carbonyl group in a molecule may be used alone or in combination.

The modified polyolefin containing a carbonyl group in a molecule may be a copolymer of an olefin and a vinyl monomer. Examples of the copolymer of an olefin and a vinyl monomer include ethylene-(meth)acrylic acid copolymers, ethylene-ethyl (meth)acrylate copolymers, and ethylene-methyl (meth)acrylate copolymers. The "(meth)acrylic acid" may be acrylic acid or methacrylic acid.

The modified polyolefin containing a carbonyl group in a molecule has an MFR of preferably from 0.1 to 100 g/10 min, more preferably from 0.3 to 50 g/10 min. The MFR is a value measured at a temperature of 230° and a load of 21.2 N in accordance with JIS K7210.

The resin composition contains preferably 1 wt % or more and 20 wt % or less modified polyolefin containing a carbonyl group in a molecule. In the case where the resin composition contains the modified polyolefin containing a carbonyl group in a molecule in an amount within the above range, an interface can be formed between the polyolefin and the polylactic acid which are immiscible with each other, so that the dispersibility concerning these components can be improved. If the resin composition contains less than 1 wt % modified polyolefin containing a carbonyl group in a molecule, the resulting molded foam product may be in a poorly foamed state. If the resin composition contains more than 20 wt % modified polyolefin, odor emission, coloring, moldability deterioration, or a water absorption increase may occur. The lower limit of the amount of the modified polyolefin containing a carbonyl group in a molecule in the resin composition is more preferably 3 wt %, and the upper limit thereof is more preferably 12 wt %.

The resin composition may contain a layered silicate. In the case where the shear force during blending the polyolefin and the polylactic acid is insufficient, adding a layered silicate improves the dispersion of the polylactic acid in the polyolefin, thereby highly dispersing foaming points in the resin composition.

Examples of the layered silicate include pyrophyllite, talc, kaolin (kaolinite), montmorillonite, apophyllite, margarite, prehnite, and mica. In particular, talc, kaolin, montmorillonite, and mica are suitable. These layered silicates may be used alone or in combination.

The resin composition contains preferably 10 wt % or more and 40 wt % or less layered silicate. If the resin composition contains less than 10 wt % layered silicate, the effect of enhancing the shear force during blending may be insufficient. If the resin composition contains more than 40 wt % layered silicate, the resin composition may exhibit poor moldability. The lower limit of the amount of the layered silicate in the resin composition is more preferably 15 wt %, and the upper limit thereof is more preferably 35 wt %.

The resin composition may contain a filler other than the layered silicate. The filler, in the case of being formed of an inorganic material, may be, for example, a metal oxide (e.g., magnesium oxide, calcium oxide), graphite, carbon black, molybdenum disulfide, tungsten disulfide, calcium carbonate, silica, silica gel, zeolite, boron nitride, or alumina. The filler, in the case of being formed of an organic material, may be, for example, a fluorine resin (e.g., polytetrafluoroethylene (PTFE)), ultrahigh molecular weight polyethylene, electron beam-crosslinked polyethylene, an aromatic polyamide, an aliphatic polyamide, silicon carbide, an acrylic resin, a phenolic resin, or a melamine resin. The resin composition may contain any amount of the filler other than the layered silicate as long as the amount does not exceed 1 wt % of the resin composition, for example.

EXAMPLES

Hereinafter, the present invention is described in more detail based on examples. The examples, however, are not intended to limit the scope of the present invention.

Example 1

Polypropylene (50 wt %), a polylactic acid (30 wt %), and talc (20 wt %) were dry-blended, and then kneaded with a twin-screw extruder ("TEX30" available from The Japan Steel Works, Ltd.) whose temperature was set to 220° C., so that a foamable thermoplastic resin composition in the form of pellets was obtained. The obtained foamable thermoplastic resin composition contained the polylactic acid particles dispersed in polypropylene. The following Table 1 shows the manufacturers and physical properties of the ingredients.

TABLE 1

|  | Manufacturer | Product No. | Physical property |
| --- | --- | --- | --- |
| Polypropylene (polyolefin) | Prime Polymer Co., Ltd. | J106G | MFR (230° C.): 15 g/10 min<br>Melt viscosity (220° C.): 390 Pa · S |
| Polylactic acid | Unitika Ltd. | TERRAMAC | MFR (190° C.): 12 g/10 min<br>Melt viscosity (220° C.): 260 Pa · S |
| Talc (layered silicate) | Nippon Talc Co., Ltd. | P-3 | Density: 2.70 g/cm$^3$ |

The obtained pellets of the foamable thermoplastic resin composition were fed into an injection molding machine equipped with a supercritical generator (Toshiba Machine Co., Ltd.). The foamable thermoplastic resin composition was blended with a supercritical fluid of nitrogen ($N_2$) (filling amount: 0.3 wt %, filling pressure: 16 MPa) while being melted in a cylinder whose temperature was set to 220° C. The filling amount (unit: wt %) of the supercritical fluid can be calculated from the following formula (1).

Filling amount(unit:wt %) of supercritical fluid=
[(flow rate of supercritical fluid×inlet time of
supercritical fluid×conversion factor27.8)/weight
of foamable thermoplastic resin composition]×
100    (1)

The molten resin obtained by blending a supercritical fluid was injected into the cavity of the mold at an injection rate of 80 mm/sec and a screw back-pressure of 15 MPa. The mold used was one that includes linear depressions and linear projections on one of its mold components as shown in FIG. 3(a), FIG. 8, and FIG. 9 and enables manufacture of a plate-like molded foam product. The temperature of the mold was 60° C.

The maximum gap size A of the mold within the cavity before the core-back process was 0.9 mm, the minimum gap size B of the mold within the cavity before the core-back process was 0.8 mm, the height C from the bases of the linear depressions to the vertexes of the linear projections of the mold was 0.1 mm, and the distance D from the centerline of one of the mold components to the surface of the other mold component was 0.85 mm. The distance H1 from the centerline to the base of a linear depression was 0.05 mm, and the distance W1 between intersections of the centerline and the ends of the linear depression was 0.1 mm. The distance H2 from the centerline to the vertex of a linear projection was 0.05 mm, and the distance W2 between intersections of the centerline and the ends of the linear projection was 0.1 mm. The volume of the cavity before the core-back process was 19.1 cm³.

Immediately after the molten resin was completely injected into the cavity 33, the core-back process was conducted. Specifically, the male mold 31 of the mold was moved back 1.5 mm to increase the volume of the cavity 33, so that foaming in the molten resin was accelerated. The volume of the cavity after the core-back process was 52.9 cm³. After the molten resin completely solidified, the molded foam product was taken out.

The molded foam product produced in the present example was a plate-like molded foam product including linear depressions and linear projections alternately on its front surface and back surface as shown in FIG. 13. Also, the molded foam product 100 had a cross-sectional structure in which, as shown in FIG. 14, the foamed layer 120 was sandwiched between the skin layers 110.

Examples 2 to 11 and Comparative Examples 1 to 9

Molded foam products were produced as in Example 1, except that the shape of the mold was varied as shown in the following Table 2. The examples and comparative examples employed a mold enabling manufacture of a plate-like molded foam product. Examples 2 to 7 employed a mold that includes linear depressions and linear projections on one of its mold components as shown in FIG. 3(a) as in Example 1. Example 8 employed a mold that includes linear depressions formed on one of its mold components and enables manufacture of a plate-like molded foam product as shown in FIG. 4. Examples 9 and 10 employed a mold that includes linear depressions and linear projections on both of its mold components (male mold and female mold) as shown in FIG. 6(a). Example 11 employed a mold that includes linear depressions and linear projections on both of its mold components (male mold and female mold) as shown in FIG. 6(b). Comparative Examples 1 to 8 employed a mold that includes no linear depressions and no linear projections on the male mold and the female mold and has a constant gap size in the cavity as shown in FIG. 7(a). Comparative Example 9 employed a mold that includes linear depressions and linear projections on both of its mold components (male mold and female mold) and has a constant gap size in the cavity as shown in FIG. 7(b).

(Evaluation on Molded Foam Product)

The heat insulation and appearance of the molded foam products produced in Examples 1 to 11 and Comparative Examples 1 to 9 were evaluated by calculating the foaming ratio by the following method. The results are shown in the following Table 2. Here, the molded foam product of Comparative Example 2 was not subjected to the following evaluation because it could not be formed into a plate shape due to insufficient injection of the molten resin caused by a small volume of the cavity before the core-back process.

(1) Foaming Ratio

The foaming ratio was calculated by dividing the volume of one molded foam product formed into a plate shape (hereinafter, such a molded foam product is also referred to as a molded foam plate) by the volume of the cavity before the core-back process. The following shows the specific calculation.

1. A bucket with a measuring line at a given position and a weight unit were prepared. The total weight (g) of the bucket and the weight unit was measured.

2. The bucket with the weight unit inside was charged with water up to the measuring line. The total weight (g) of the bucket, the weight unit, and water was measured.

3. The total weight of the bucket and the weight unit was subtracted from the total weight of the bucket, the weight unit, and water. The difference was divided by the density (1 g/cm³) of water to calculate the volume X (cm³) of water without any molded foam plate.

4. Ten molded foam plates were prepared for each of Examples 1 to 11 and Comparative Examples 1 to 9. The ten molded foam plates were placed in the empty bucket. The weight unit was placed on the plates, and then water was put into the bucket up to the measuring line. The total weight Y (g) was measured.

5. The total weight of the bucket and the weight unit was subtracted from the total weight Y. The resulting difference was divided by the density (1 g/cm³) of water to calculate the volume Z (cm³) of water with the molded foam plates.

6. The volume Z was subtracted from the volume X. The resulting difference was divided by 10 to calculate the volume (cm³) of one molded foam plate.

7. The volume of one molded foam plate was divided by the volume (cm³) of the cavity before the core-back process to calculate the foaming ratio of the molded foam plate.

(2) Heat Insulation Evaluation

A heat-insulating box was partitioned at a middle point using a molded foam plate, so that two rooms with the same volume were produced. A heater and a thermocouple were placed in a first room, while only a thermocouple was placed in a second room. The first room was heated with the heater. The time required for the temperature difference between the first room with the heater and the second room to reach 30° C. was measured. The molded foam plate was evaluated as accepted (marked as "o") when this duration was 120 minutes or longer, and evaluated as rejected (marked as "x") when this duration was shorter than 120 minutes.

(3) Appearance Evaluation

In each of Examples 1 to 11 and Comparative Examples 1 to 9, 100 samples of the molded foam product were prepared. The appearance of the samples was visually observed. The molded foam product was evaluated as accepted (marked as "o") when none of its samples had any blister and any crinkle on the surface, and evaluated as rejected (marked as "x") when one or more of its samples had a blister or a crinkle on the surface.

TABLE 2

| | | Mold shape | | Height from base of depression to peak of projection | | Shape of projection/depression on female mold | | | |
|---|---|---|---|---|---|---|---|---|---|
| | | Maximum gap size (A) in cavity (mm) | Minimum gap size (B) in cavity (mm) | (C) (mm) | (C') (mm) | H1 (mm) | W1 (mm) | H2 (mm) | W2 (mm) |
| | Projection/depression shape | | | | | | | | |
| Example 1 | Projection/depression on one of mold components | 0.9 | 0.8 | 0.1 | — | 0.05 | 0.1 | 0.05 | 0.1 |
| Example 2 | Projection/depression on one of mold components | 0.5 | 0.4 | 0.1 | — | 0.05 | 0.1 | 0.05 | 0.1 |
| Example 3 | Projection/depression on one of mold components | 0.6 | 0.2 | 0.4 | — | 0.2 | 0.4 | 0.2 | 0.4 |
| Example 4 | Projection/depression on one of mold components | 0.8 | 0.4 | 0.4 | — | 0.2 | 0.4 | 0.2 | 0.4 |
| Example 5 | Projection/depression on one of mold components | 1.4 | 0.4 | 1.0 | — | 0.5 | 1.0 | 0.5 | 1.0 |
| Example 6 | Projection/depression on one of mold components | 0.8 | 0.6 | 0.2 | — | 0.1 | 0.2 | 0.1 | 0.2 |
| Example 7 | Projection/depression on one of mold components | 3.0 | 1.5 | 1.5 | — | 0.75 | 1.5 | 0.75 | 1.5 |
| Example 8 | Depression alone on one of mold components | 0.8 | 0.6 | 0.2 | — | 0.2 | 0.4 | — | — |
| Example 9 | Projection/depression on both mold components | 0.55 | 0.3 | 0.2 | 0.2 | 0.1 | 0.2 | 0.1 | 0.2 |
| Example 10 | Projection/depression on both mold components | 0.64 | 0.25 | 0.4 | 0.1 | 0.2 | 0.4 | 0.2 | 0.4 |
| Example 11 | Projection/depression on both mold components | 1.0 | 0.2 | 0.4 | 0.4 | 0.2 | 0.4 | 0.2 | 0.4 |
| Comparative Example 1 | None | 0.4 | 0.4 | — | — | — | — | — | — |
| Comparative Example 2 | None | 0.2 | 0.2 | — | — | — | — | — | — |
| Comparative Example 3 | None | 0.9 | 0.9 | — | — | — | — | — | — |
| Comparative Example 4 | None | 1.8 | 1.8 | — | — | — | — | — | — |
| Comparative Example 5 | None | 2.5 | 2.5 | — | — | — | — | — | — |
| Comparative Example 6 | None | 3.2 | 3.2 | — | — | — | — | — | — |
| Comparative Example 7 | None | 0.7 | 0.7 | — | — | — | — | — | — |
| Comparative Example 8 | None | 1.0 | 1.0 | — | — | — | — | — | — |
| Comparative Example 9 | Projection/depression on both mold components | 0.6 | 0.6 | 0.4 | 0.4 | 0.2 | 0.4 | 0.2 | 0.4 |

| | Shape of projection/depression on female mold | | | | Volume of cavity before core-back | Volume of cavity after core-back | Evaluation | | |
|---|---|---|---|---|---|---|---|---|---|
| | H1' (mm) | W1' (mm) | H2' (mm) | W2' (mm) | process (cm³) | process (cm³) | Foaming ratio | Heat Insulation | Appearance |
| Example 1 | — | — | — | — | 19.1 | 52.9 | 3.1 | ○ | ○ |
| Example 2 | — | — | — | — | 10.1 | 43.9 | 4.8 | ○ | ○ |
| Example 3 | — | — | — | — | 9.0 | 42.8 | 5.3 | ○ | ○ |
| Example 4 | — | — | — | — | 13.5 | 47.3 | 3.9 | ○ | ○ |
| Example 5 | — | — | — | — | 20.3 | 54.0 | 3.2 | ○ | ○ |
| Example 6 | — | — | — | — | 15.8 | 49.5 | 3.4 | ○ | ○ |
| Example 7 | — | — | — | — | 50.6 | 84.4 | 2.4 | ○ | ○ |
| Example 8 | — | — | — | — | 16.5 | 50.3 | 3.3 | ○ | ○ |
| Example 9 | 0.1 | 0.2 | 0.1 | 0.2 | 9.0 | 42.8 | 5.1 | ○ | ○ |
| Example 10 | 0.05 | 0.1 | 0.05 | 0.1 | 10.1 | 43.9 | 4.7 | ○ | ○ |
| Example 11 | 0.2 | 0.4 | 0.2 | 0.4 | 13.5 | 47.3 | 4.1 | ○ | ○ |
| Comparative Example 1 | — | — | — | — | 9.0 | 42.8 | 1.1 | x | x |
| Comparative Example 2 | — | — | — | — | 4.5 | 38.3 | Injection failure | | |
| Comparative Example 3 | — | — | — | — | 20.3 | 54.0 | 2.3 | x | ○ |
| Comparative Example 4 | — | — | — | — | 40.5 | 74.3 | 1.9 | x | x |
| Comparative Example 5 | — | — | — | — | 56.3 | 90.0 | 2.2 | ○ | x |
| Comparative Example 6 | — | — | — | — | 72.0 | 105.8 | 1.5 | ○ | x |
| Comparative Example 7 | — | — | — | — | 15.8 | 49.5 | 1.7 | x | ○ |

TABLE 2-continued

| | | | | | | | | | |
|---|---|---|---|---|---|---|---|---|---|
| Comparative Example 8 | — | — | — | — | 22.5 | 56.3 | 2.3 | x | ○ |
| Comparative Example 9 | 0.2 | 0.4 | 0.2 | 0.4 | 13.5 | 42.8 | 2.1 | x | ○ |

REFERENCE SIGNS LIST

20 Supercritical injection molding apparatus
21 Hopper
22 Cylinder
23 Screw
24 Nozzle
25 Gas bottle
26 Supercritical fluid generator
27 Injection controller
30, 330 Mold
31, 331 First mold component (male mold)
32, 332 Second mold component (female mold)
33 Cavity
34 Runner
35, 135 Resin injection port
36 Linear depression
37 Linear projection
38 Linear flat portion
100 Molded foam product
110 Skin layer (outer skin layer)
120 Foamed layer
136 Thin portion
137 Thick portion
200 Food container

The invention claimed is:

1. A method for manufacturing a molded foam product, comprising the steps of:

injecting, during injection molding, a molten resin containing a supercritical fluid or a chemical foaming agent into a cavity formed in a mold that includes a movable portion; and moving the movable portion to increase a volume of the cavity before the molten resin injected into the cavity completely solidifies, the mold alternately including, in a direction from a resin injection port to a periphery of the cavity, first linear portions each giving a large gap size in the cavity and second linear portions each giving a small gap size in the cavity, wherein the first linear portions and the second linear portions satisfy $Ha>Hb$, where Ha represents the gap size in the cavity in each first linear portion, Hb represents the gap size in the cavity in each second linear portion, and Ha and Hb are each 0.2 mm or greater and 3.0 mm or smaller.

2. The method for manufacturing a molded foam product according to claim 1, wherein the first linear portions each include a linear depression formed on a surface of the mold facing the cavity and the second linear portions each include a linear projection formed on the surface of the mold facing the cavity.

3. The method for manufacturing a molded foam product according to claim 2, wherein a height from bases of the linear depressions to vertexes of the linear projections is 0.1 mm or greater.

4. The method for manufacturing a molded foam product according to claim 1, wherein Ha is 0.4 mm or greater and 3.0 mm or smaller and Hb is 0.2 mm or greater and 1.5 mm or smaller.

5. The method for manufacturing a molded foam product according to claim 1, which manufactures a molded foam product that includes thick portions and thin portions alternately on its front surface and back surface.

* * * * *